United States Patent [19]

Grossman

[11] Patent Number: 5,653,873
[45] Date of Patent: Aug. 5, 1997

[54] SYSTEM FOR REDUCING LIQUID WASTE GENERATED BY DRY CLEANING

[76] Inventor: Bruce Grossman, 107 Via Del Cerrito, Encinitas, Calif. 92024

[21] Appl. No.: 510,853

[22] Filed: Aug. 3, 1995

[51] Int. Cl.⁶ .................................. B01D 3/42; B01D 3/36
[52] U.S. Cl. .................. 210/149; 68/18 C; 68/18 R; 96/182; 96/203; 202/176; 210/167; 210/180
[58] Field of Search ...................... 210/97, 149, 167, 210/175, 180, 181, 188, 257.1, 258, 259, 742; 203/2, 10, 39, 95, DIG. 18; 202/160, 170, 176, 163; 68/18 R, 18 C; 159/44; 261/7; 96/156, 173, 182, 202, 203

[56] References Cited

U.S. PATENT DOCUMENTS

| | | |
|---|---|---|
| 3,692,467 | 9/1972 | Durr et al. |
| 3,977,218 | 8/1976 | Zucchini ............................ 68/18 R |
| 4,091,643 | 5/1978 | Zucchini ............................ 68/18 C |
| 4,513,590 | 4/1985 | Fine .................................. 68/18 C |
| 4,664,754 | 5/1987 | Caputi et al. ...................... 203/39 |
| 4,885,099 | 12/1989 | Kelly ................................ 203/39 |
| 5,194,185 | 3/1993 | Cannon et al. ..................... 68/18 C |
| 5,236,580 | 8/1993 | Kelleher ............................ 210/97 |
| 5,525,213 | 6/1996 | Phillips ............................. 210/167 |

*Primary Examiner*—Joseph W. Drodge
*Attorney, Agent, or Firm*—M. Shevlin

[57] ABSTRACT

A system and method for reducing the volume of the liquid hazardous waste stream generated as a byproduct of the dry cleaning process combines an air atomization apparatus, and a temperature controlled water injection apparatus. The air atomization apparatus disposes of separator water by misting. The temperature controlled injection apparatus uses dry cleaning separator water to create and boil an azeotropic mixture in the still of the dry cleaning machine itself. Consequently, the storage and disposal of separator water is eliminated and almost no solvent is left in the residue of the still before disposal.

3 Claims, 2 Drawing Sheets

SYSTEM FOR REDUCING LIQUID WASTE GENERATED BY DRY CLEANING

FIELD OF THE INVENTION

The present invention relates generally to dry cleaning processes, and more particularly to systems and methods for reducing the liquid hazardous waste generated by the dry cleaning process.

BACKGROUND

Dry cleaning machines and processes utilize a dry cleaning fluid which normally a solvent, such as perchloroethylene or trichloroethylene, and trace amounts of water. As a byproduct of the dry cleaning process, liquid waste is generated. In particular, during the dry cleaning process in which perchloroethylene is used as a solvent, two separate liquid waste streams are generated. The first type of liquid waste is water containing a small amount of dissolved solvent. This contaminated waste water is generated by the condensing processes used in reclaiming solvent from washed garments during the drying phase of the dry cleaning process, and in condensing solvent vapor emitted by a solvent still. The second type of liquid waste is the residue left in the bottom of the still after the distillation process is completed. This residue will typically be a liquid mixture of detergents used in the dry cleaning process, various fatty acid compounds, and from 40% to 60% by volume of solvent.

It has been determined by governmental environmental authorities that liquid waste generated by the dry cleaning process may harm the environment. Laws and regulations have been promulgated which limit the amounts of hazardous waste, such as dry cleaning solvents, that may be released into the environment. Disposal of the liquid waste is thus very costly since it must comply with costly waste disposal procedures.

In an attempt to solve the liquid waste disposal problem, a number of systems that reclaim or recover solvents, or decontaminate waste water, are well known in the art. For example, a system that reclaims solvent is disclosed in U.S. Pat. No. 4,637,232 to Zucchini for an apparatus for recycling of solvent used in dry cleaning machines. It is directed to a distillation process using a still to recover the solvent from the water. A distillation chamber boils and vaporizes an azeotropic mixture of solvent and water, producing a fluid which then condenses to pure solvent. An azeotrope is a liquid mixture that maintains a constant boiling point and that produces a vapor of the same composition as the mixture. The solvent is then reclaimed, and the remaining waste water is reused in the distillation process with additional waste water generated by the dry cleaning process.

Other systems include that disclosed in U.S. Pat. No. 5,236,580 to Kelleher for a device for reclaiming dry cleaning solvent from a dry cleaning machine. It discloses an evaporator having a heating element which is activated by a sensor which detects the rising level of unevaporated waste liquid. Yet another system is disclosed in U.S. Pat. No. 5,223,126 to Phillips for decontaminating dry cleaning waste water with controlled pumping. It discloses a settling chamber for separating solvent from waste water, and use of filters for reclaiming solvent form the water. The water is then evaporated in a heated evaporating chamber. Other systems include those disclosed in U.S. Pat. No. 4,637,232 to Zucchini and U.S. Pat. No. 4,513,590 to Fine.

However, these prior art systems address only one segment of the liquid waste stream generated in the dry cleaning systems process and do so with the stated intention of either reclaiming the extremely small quantities of solvent in the separator water stream and/or purifying this water prior to disposal. There is no provision whatsoever for any treatment of the still residue waste water to reduce the volume of liquid hazardous waste or reclaim any residual solvent which may be held therein.

Environmental considerations coupled with increasing disposal and solvent costs thus indicate the need for an efficient and effective system and method for further reducing liquid waste generated by dry cleaning. In particular, it would be beneficial to reduce the volume of liquid still residue generated by reclaiming that 40 to 60 percent solvent from the liquid still residue before disposal by automatically forming an azeotropic mixture in the still itself which will flash off almost the entire residual solvent content in the still residue. This solvent reclaimed from the still residue is reusable and results in the double savings of reduced hazardous waste volume and reduced solvent replacement cost. In addition, there is a need to lower the hazardous waste handling costs of contaminated separator water by legally disposing of the water by air-atomization.

Accordingly, it would be desirable to provide an apparatus and method which would economically manage or reduce the entire liquid hazardous waste stream by combining the elimination of separator water and the reduction of the solvent content in the still residue into a single apparatus and accomplish this reduction without the addition or generation of additional hazardous substances.

As recognized by the present invention but not by the prior art patents, these and other disadvantages can be overcome using a system and method that reduces the volume of liquid residue generated by the still. It accomplishes this by efficiently reclaiming solvent from this liquid still waste, leaving water which may be safely and economically disposed of without harming the environment. It is an object of the present invention to provide a system and method for reducing the volume of liquid hazardous waste generated by the dry cleaning process which reclaims a significant portion of dry cleaning solvent from the liquid still waste. Another object of the present invention is to provide a system for and method for reducing the volume of liquid hazardous waste from dry cleaning by disposing of water obtained from the process safely and economically without causing environmental damage or violating governmental laws and regulations. Yet another object of the present invention is to provide a system for and method for reducing the volume of liquid hazardous waste from dry cleaning which is easy and convenient to use and cost effective in its use and manufacture.

SUMMARY OF THE INVENTION

A preferred embodiment of the system and method for reducing the volume of dry cleaning process liquid waste which is generated by a dry cleaning process, comprising a storage tank device for receiving and containing separator waste water from a dry cleaning machine separator. The tank includes a settling zone where the solvent settles by gravity to create a layer of solvent beneath a layer of separated water. An automatic injection apparatus is connected to the tank for automatically injecting a measured amount of separated water from the tank means into a still, to create an azeotropic mixture of solvent and waste water, in response to the temperature of the mixture in the still dropping below a specified temperature. A water evaporation apparatus is also connected to the tank for automatically siphoning the separated water from the tank to an air-atomization evaporator. An electronic solid state controller is included in the system for controlling operation of the automatic injection means and the water evaporation means. The system includes a fluid level sensor in the tank for automatically activating the evaporator when a set level of separated water is present in the tank. There is also provided a solvent level sensor that automatically deactivates the system and engages an alarm when the level of solvent in the bottom of the tank reaches a predetermined amount.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
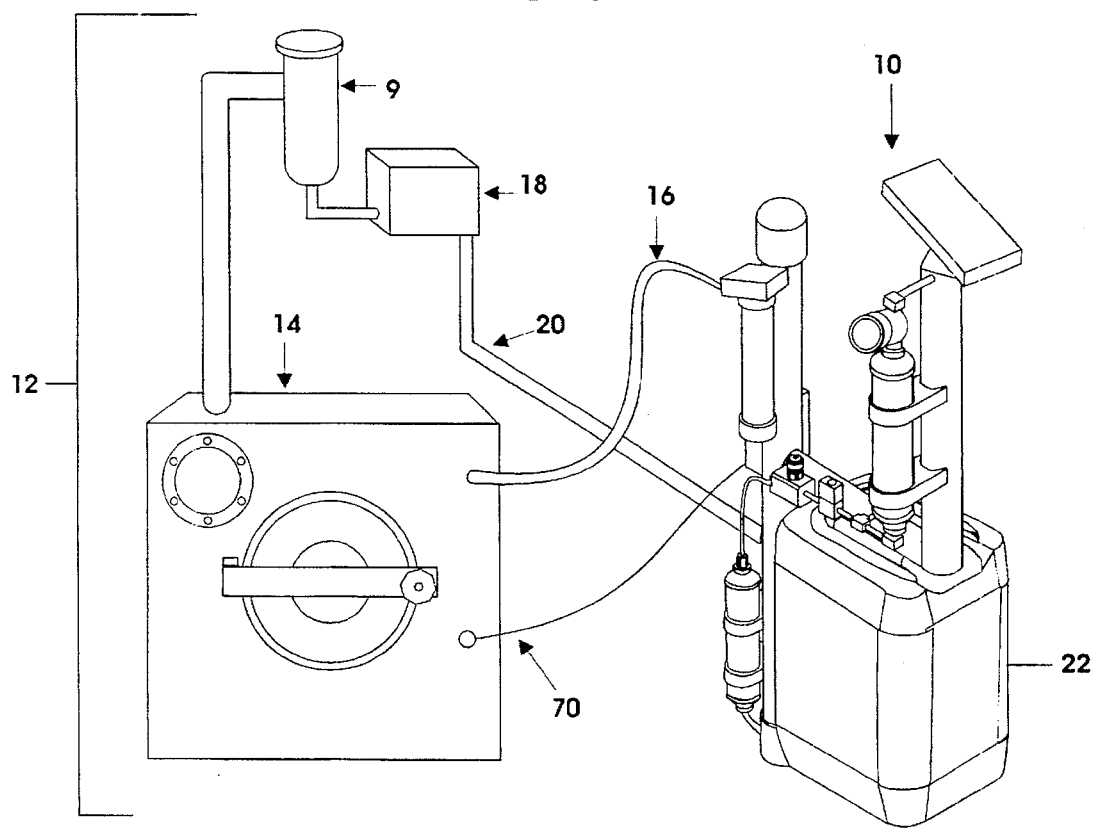
FIG. 1 is a perspective view of a dry cleaning liquid waste management system as used in its intended environment in accordance with the present invention.

In FIG. 1, there is shown a dry cleaning liquid waste management system 10 connected in fluid communication with dry cleaning machine distillation system 12. Dry cleaning distillation system 12 is a conventional dry cleaning machine distillation system which includes a still 14 for vaporizing solvent by heating the solvent and a condenser 9 for cooling and liquefying the solvent and other vapors. Still 14 is connected to system 10 via still inlet connection tube 16. Dry cleaning distillation system 12 also includes a gravity separator 18 for mechanically separating the solvent from the water. Separator waste water exiting the separator 18 carried to system 10 by separator outlet connecting tube 20.

Figure 2:
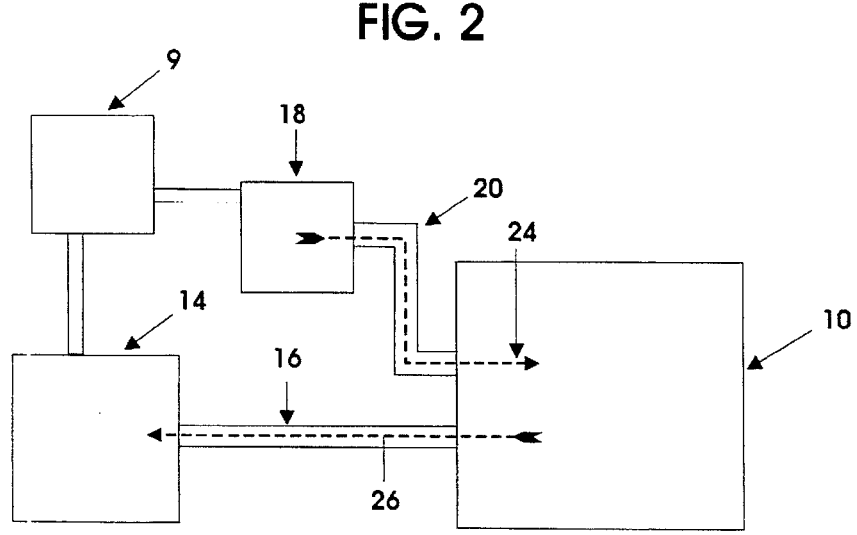
FIG. 2 is a schematic block diagram of the dry cleaning liquid waste management system in accordance with the present invention.

System 10 comprises a reservoir or tank 22 for containing dry cleaning separator waste water generated by the dry cleaning and distillation process. This waste water was condensed from the vapor phase at the same time as the solvent vapor was condensed in condenser 9 and is carried to tank 22 by outlet tube 20. This arrangement is shown schematically in FIG. 2. The flow of dry cleaning separator waste water from the separator 18 to system 10 is shown via arrow 24. The flow of separated water from system 10 to still 20 as further explained below is shown via arrow 26.

Figure 3:
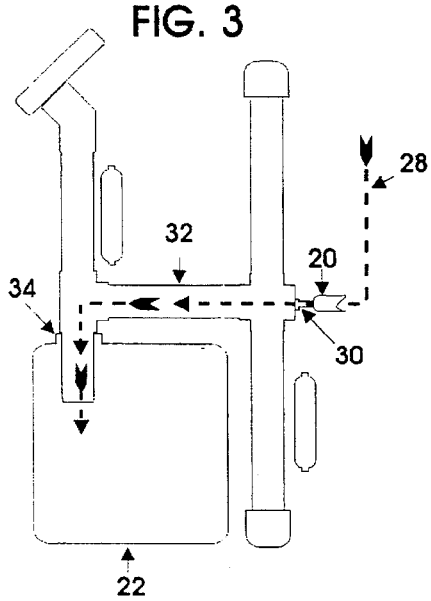
FIG. 3 is a schematic diagram showing a portion of the dry cleaning liquid waste management system for receiving separator waste water in accordance with the present invention.
Figure 4:
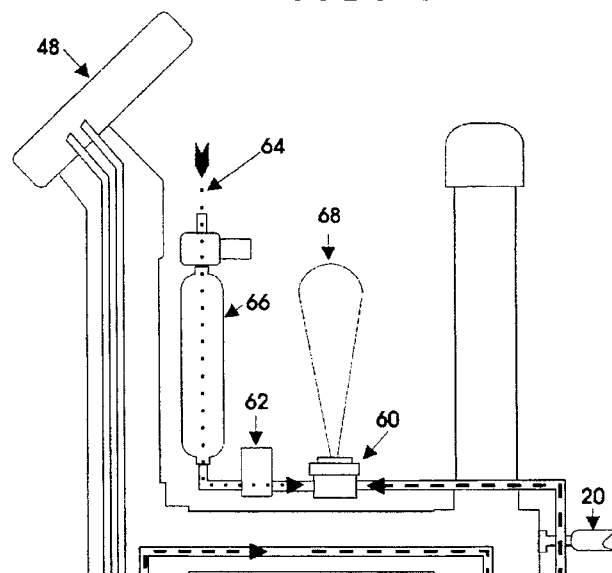
FIG. 4 is a schematic diagram showing a portion of the dry cleaning liquid waste management system for automatically evaporating separated water.

Referring now to FIGS. 3 and 4 showing system 10 in more detail, dry cleaning separator waste water 28, which comprises water and dissolved solvent such as perchlorethylene or trichloroethylene in the concentration of approximately 150 to 300 parts per million and small amounts of liquid phase solvent, is fed via gravity from dry cleaning separator 18 via tube 20 to separator waste water inlet 30. Waste water 28 is carried by tubing 32 into the top of tank 22 at tank inlet port 34. Tank 22 includes a settling area 36 at the bottom of tank 22. The liquid phase solvent portion 38 settles by gravity out of waste water 28 into the bottom of tank 22, thereby creating a layer of liquid solvent 38 situated beneath a layer of separated water 40 which is essentially free of liquid phase solvent, having a concentration of solvent in the range of 150 to 300 parts per million. This is well within the range of acceptable concentrations for release into the environment without harming the environment or violating governmental environmental laws and regulations. A probe sensor 42 is positioned in bottom area 36 at a predetermined distance 44 from the bottom 46 of tank 22. As explained in more detail below, when the amount of reclaimed solvent 38 accumulates to a depth greater than distance 44, the solvent is sensed by probe 42 which is connected to controller 48. This activates an alarm indicating that the solvent 38 is to be emptied form tank 22, and also automatically shuts down system 10 to prevent any solvent layer 38 from being inadvertently released from the system 10.

A fluid level detector 50 is positioned in tank 22 at a predetermined location. Also located in tank 22 is water inlet port 52 of outlet tubing 54, for carrying separated water 40 through carbon filter 56 in the direction of arrow 58. It is to be noted that probe 42 is located a safe distance below inlet 52 to assure only separated water 40 and not reclaimed solvent 38 is drawn into inlet 52. Mounted on the top of system 10 is an air-atomization nozzle 60. Connected to one side of nozzle 60 is an air flow solenoid 62, which controls flow of air 64 from a pressurized air source through air filter 66. The flow of highly pressurized air through atomization nozzle 60 causes separated water 40 to be drawn from tank 22 through inlet 52 along tubing 54 through carbon filter 56 into nozzle 60. There it is mixed with high pressure air and ejected out of nozzle 60 in the form of an atomized evaporative spray 68.

Figure 5:
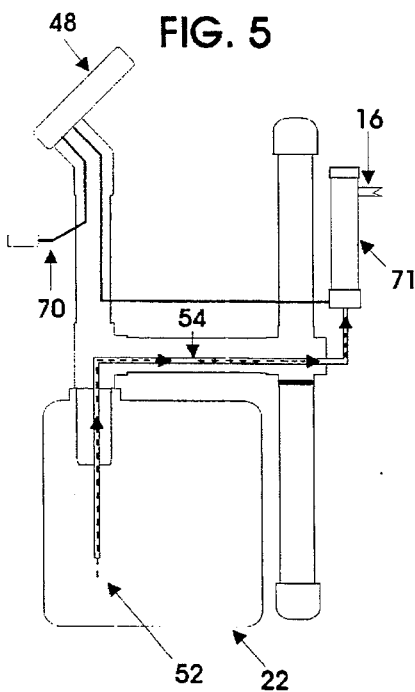
FIG. 5 is a schematic diagram showing a portion of the dry cleaning liquid waste management system for automatically injecting a measured amount of separated water into a still for creating an azeotropic mixture.

In FIG. 5, there is further shown the portion of system 10 for automatically injecting water into still 14 from tank 22. Temperature sensor 70 is located in still 14 and electrically connected to controller 48. Also electrically connected to controller 48 is a water injection pump 71. Pump 71 is coupled in fluid communication with outlet tubing 54 for pumping a measured amount of separated water 40 from tank 22 to still 14 through still inlet tube 16.

In operation, separator waste water 28 from separator 18 is introduced via separator outlet tube 20 through tube 32 into tank 22. The dry cleaning separator waste water settles in bottom settling area 36 into a layer of solvent 38 and separated water 40. As long as the level of water 40 is above fluid level sensor 50, controller 48 automatically activates air solenoid 62 to cause compressed air 64 to flow through nozzle 60. This causes separated water 40 to be dram from tank 22 through inlet 52 and forcefully ejected in a fine mist from air atomization nozzle 60, thereby evaporating separated water 40. As earlier mentioned, the concentration of solvent particles in water 40 is 150 to 300 parts per million, well within the acceptable limits. This process continues automatically for as long as the water level is above sensor 50.

Simultaneously, the temperature in the still 14, which contains solvent, fatty acids, and detergents, is monitored via temperature sensor 70. At the end of the normal distillation process when the still content is cooked down to a residue from which little or no further solvent can be boiled, the controller 48 is set to perform the azeotrope function. Upon activating the controller's azeotrope function, the heat to still 14 is automatically shut off. When the temperature of the still 14 contents drops below 195 degrees Fahrenheit, it is sensed by the temperature sensor 70 and electronically communicated to the controller 48. The still 14 heat is turned back on, and the controller 48 automatically activates the injection pump 71. Injection pump 71 injects through tube 16 a measured amount of separated water from tank 22 to still 14. By automatically adding water to the still 14 in the appropriate amounts at the appropriate temperature, an azeotropic mixture is created, depressing the boiling point of the solvent water mixture to approximately 205 degrees Fahrenheit. This causes the solvent and water to be vaporized at a lower temperature, significantly reducing the solvent content in the remaining still residue. The water and solvent vapor are then condensed in still condenser 9 and flow into the dry cleaning machine water separator 18. The separator 18 returns the solvent to the appropriate tank in the dry cleaning machine and the separator waste water 28 flows into the tank 22 via separator outlet tube 20 and tube 32 for evaporation. After the azeotropic solvent water mixture has evaporated, the still temperature rises. The temperature sensor 70 communicates the rising temperature to the controller 48. When the still temperature reaches approximately 210 degrees Fahrenheit, the controller ends the azeotroping cycle and returns control of the still heating to the dry cleaning machine.

By the action of both evaporating water from the separator 16 and the azeotropic distillation of waste in the still 14, system 10 effectively reclaims 40% to 60% by volume of solvent from the still waste stream, and disposes of contaminated water by safe effective evaporation, continuously, automatically, as required.

While the particular dry cleaning liquid waste management system and method as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly limited by nothing other than the appended claims.

What is claimed is:

1. A system for reducing the volume of liquid waste generated by a dry cleaning process, comprising:

a dry cleaning machine including a still, a still condenser and dry cleaning separator;

a storage tank means for receiving and containing separator waste water from the dry cleaning separator, said tank means including a settling zone where the separator waste water is separated into a solvent and a separated water, the solvent settling by gravity creating a layer of solvent beneath a layer of separated water;

automatic injection means associated with the tank means for automatically injecting a measured amount of separated water from the tank means to the still to create an azeotropic mixture of solvent and waste water in response to the temperature of contents in the still dropping below a specified temperature, the azeotropic mixture of solvent being condensed in the still condenser and flowing into the dry cleaning separator;

water evaporation means associated with the tank means for automatically pumping separated water from the tank to an air-atomization evaporator;

control means for controlling operation of the automatic injection means and the water evaporation means.

2. The system of claim 1 wherein the automatic injection means includes a temperature sensor associated with the still.

3. The system of claim 1, wherein the water evaporation means includes a nozzle having a high velocity air outlet connected to an air flow control device.

* * * * *